July 3, 1923.
H. HAMPEL
1,460,898
PROCESS FOR MAKING NITRATES
Filed April 7, 1921
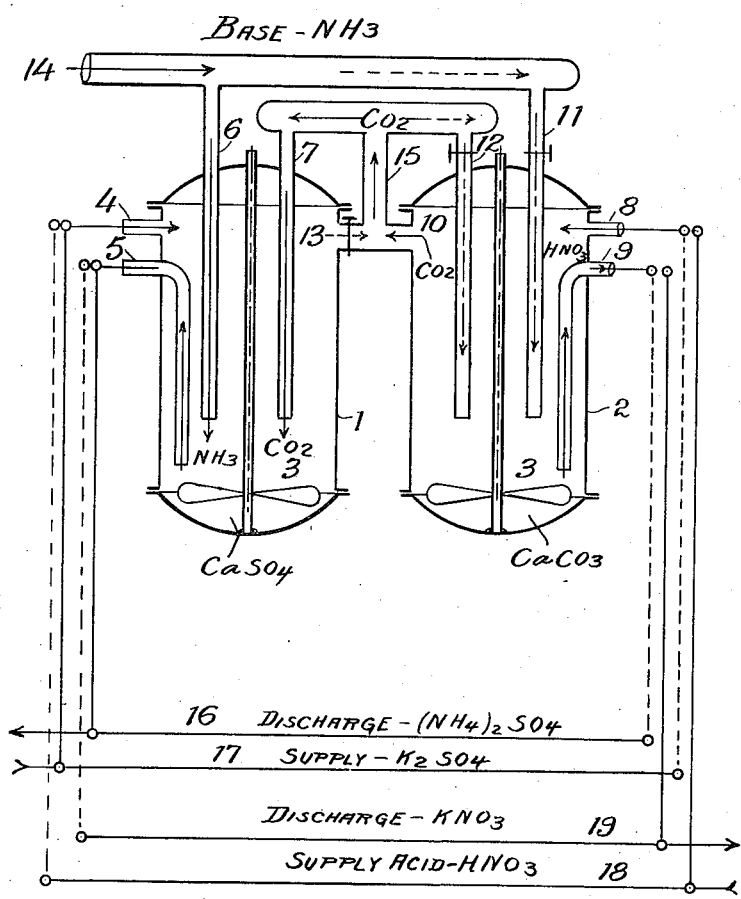
Inventor
Heinrich Hampel
by Henry Ost Jr
Attorney Patented July 3, 1923.

1,460,898

UNITED STATES PATENT OFFICE.

HEINRICH HAMPEL, OF HALLE, GERMANY.

PROCESS OF MAKING NITRATES.

Application filed April 7, 1921. Serial No. 459,203.

*To all whom it may concern:*

Be it known that I, HEINRICH HAMPEL, a subject of the German State, and resident of Halle, in the State of Prussia, Germany, have invented certain new and useful Improvements in a Process of Making Nitrates (for which I have filed applications in Germany, Mar. 10 and 31, 1919); and I do hereby declare the following to be a full, clear, and exact description of the invention, such as will enable others skilled in the art to which it pertains to make and use the same.

The present invention consists in a cyclic process by the use of which it is possible to react with a suitable substance on salts of a strong acid, and obtain a corresponding salt of a weaker acid in those cases, where the weaker acid cannot precipitate the salt directly or at least only incompletely and to reproduce the reacting substance for return into the cycle of operations for use with a new quantity of strong acid salt. This process is of particular importance for producing of nitrates of potassium, sodium or magnesium.

I shall give at first a general description of this process, which will be explained by some examples below.

By the letters A and B may be indicated two different metal radicals or organic radicals. By $x$, $y$ and $z$ be indicated three radicals of an acid explained below. The kind and application of the acids will be evident in course of the further presentation.

$Ax$ may be the soluble salt of a metal and an acid $H-x$, from which the salt $A-y$ shall be produced by employing the acid $Hy$, and which cannot be produced directly or at least only incompletely. For obtaining the transformation another metal B is taken, forming the three combinations $Bx$, $By$ and $Bz$, in which $x$ and $y$ are the radicals of the acids above mentioned and $z$ is a radical, the qualities of which will be hereinafter given.

Of the three combinations of the metal B the $By$ salt may be easily soluble, then $Bx$ and $Bz$ must be difficultly soluble at least in comparison to $By$. Besides $Bx$ must be more soluble than $Bz$.

The following conditions are necessary for the acid radical $z$: If it is the radical of an oxygen acid (say for example $H_2CO_3$ or $H_2SO_3$), the anhydrid of acid Z, (perhaps $CO_2$ or $SO_2$) must be capable of effecting the following reaction with a suitable base:

$$2NH_3 + Z + H_2O = (NH_4)2ZO = (NH_4)_2z.$$

for example $$2NH_3 + CO_2 + H_2O = (NH_4)_2CO_3.$$

However if the acid $Hz$ does not contain oxygen ($H_2S$ or $HCl$), the following reaction must be possible:

$$2NH_3 + H_2S = (NH_4)_2S.$$

Besides it is necessary, that in this case to employ oxy-acids whose anhydrid Z or acids free of oxygen $Hz$ that can be expelled in gaseous form by the reacting acid $Hy$ or is precipitated by adding this acid, which latter condition however comes less into consideration.

After having discovered the combinations $Bx$, $By$ and $Bz$ conforming to the salt of metal $Ax$ and to the transporting acid $Hy$ in regard to the conditions mentioned above I can explain the process following by general formulæ, which will be changed later.

The salt $Ax$ is dissolved and then the salt of the transforming acid ($By$) is added when the following reaction results:

*a.*   $Ax + By = Ay + Bx.$

The salt $Bx$ being difficultly soluble is precipitated. The required salt $Ay$ can be removed from the solution which has been separated from the precipitate by boiling perhaps.

The precipitated salt $Bx$ which should be difficultly soluble relatively to $Ay$, now is dissolved suitably in a greater quantity of liquid and serves for the reaction $b$:

*b.* 1. If $Hz$ is an oxy-acid having an anhydrid Z, the reaction is the following:

$$Bx + 2NH_3 + H_2O + Z = Bz + (NH_4)_2x$$

2. If $Hz$ does not contain oxygen, the reaction is the following:

$$Bx + NH_3 + Hz = Bz + (NH_4)x.$$

In both cases the salt $Bz$ is precipitated, because it is more difficultly soluble than $Bx$.

To recover the combinations H$z$ and B$y$ employed in the reactions $a$ and $b$ the process is the following:

c. 1. If H$z$ is an oxy-acid, the reaction is the following:

$$Bz + Hy = By + Z + H_2O.$$

2. If H$z$ does not contain oxygen, the reaction is the following:

$$Bz + Hy = By + Hz.$$

In this manner I have a cyclic process.

In the place of $NH_3$ or $(NH_4)OH$ also other hydroxides may be employed, for example NaOH or KOH.

*Examples.*

I. The manufacturing of potassium (or sodium—or magnesium) nitrates from their sulphates.

$a.$ $K_2SO_4 + Ca(NO_3)_2 = 2KNO_3 + CaSO_4.$

To the concentrated solution of potassium sulphate, calcium nitrate is added, till all the sulfuric acid is precipitated as $CaSO_4$. After having precipitated and separated from the solution the sulfate of calcium thus formed, the precipitate is transformed to carbonate of calcium by means of ammonia and carbondioxide.

$b.$ $CaSO_4 + 2NH_3 + CO_2 + H_2O =$
$$CaCO_3 + (NH_4)_2SO_4$$

Finally the precipitated carbonate of calcium is treated by nitric acid forming the nitrate of calcium and carbondioxide, which escapes as a gas:

$c.$ $CaCO_3 + 2HNO_3 =$
$$Ca(NO_3)_2 + CO_2 + H_2O$$

Thus the process is a continuous cyclic one. The nitrate of calcium is employed in the transformation $a$, the escaping carbondioxide in the transformation $b$. Out of the solution formed by the reaction $b$ I can get the sulfate of ammonium as a byproduct; this is of great importance for the commercial value of the procedure.

*Other examples.*

II. The manufacturing of iodide of aluminium from sulfate of aluminium:

$a.$ $Al_2(SO_4)_3 + 3CaI_2 = 2AlI_3 + 3CaSO_4$
$b.$ $3CaSO_4 + 6NH_3 + 3H_2O + 3CO_2 =$
$$3CaCO_3 + 3(NH_4)_2SO_4$$
$c.$ $3CaCO_3 + 6HI = 3CaI_2 + 3CO_2 + 3H_2O$

III. The manufacturing of acetate of sodium from chloride of sodium:

A. With carbon dioxide:

$a.$ $2NaCl + Pb(C_2H_3O_2)_2 =$
$$PbCl_2 + 2Na(C_2H_3O_2)$$
$b.$ $PbCl_2 + 2NH_3 + CO_2 + H_2O =$
$$Pb(CO_3) + 2NH_4Cl$$
$c.$ $PbCO_3 + 2H(C_2H_3O_2) =$
$$Pb(C_2H_3O_2)_2 + CO_2 + H_2O.$$

B. Employing hydrogen sulphid.

$a.$ $2NaCl + Pb(C_2H_3O_2)_2 =$
$$PbCl_2 + 2Na(C_2H_3O_2)$$
$b.$ $PbCl_2 + 2NH_3 + H_2S = PbS + 2NH_4Cl,$
$c.$ $PbS + 2H(C_2H_3O_2) = H_2S + Pb(C_2H_3O_2)_2$

IV. The manufacturing of chloride of magnesium from sulfate of magnesium:

A. With ammonia used in the cycle:

$a.$ $MgSO_4 + CaCl_2 = CaSO_4 + MgCl_2.$
$b.$ $CaSO_4 + 2NH_3 + CO_2 + H_2O =$
$$CaCO_3 + (NH_4)_2SO_4$$
$c.$ $CaCO_3 + 2HCl = CaCl_2 + CO_2 + H_2O$

B. In connection with another base, for example hydroxide of potassium used in the cycle:

$a.$ $MgSO_4 + CaCl_2 = CaSO_4 + MgCl_2,$
$b.$ $CaSO_4 + 2KOH + CO_2 =$
$$CaCO_3 + K_2SO_4 + H_2O$$
$c.$ $CaCO_3 + 2HCl = CaCl_2 + CO_2 + H_2O$

Other hydroxides than hydroxide of ammonium should be employed chiefly in the producing organic compounds.

V. The manufacturing of nitrate of alkali (as potassium, sodium, magnesium) from their chlorides.

$a.$ $2Alk.Cl + Pb(NO_3)_2 = 2Alk.NO_3 + PbCl_2$
$b.$ $PbCl_2 + 2NH_3 + CO_2 + H_2O =$
$$PbCO_3 + 2NH_4Cl.$$
$c.$ $PbCO_3 + 2HNO_3 = Pb(NO_3)_2 + CO_2 + H_2O$

As the above example for producing the acetate of sodium (III) demonstrates, the process is not limited to the production of salts of inorganic acids, it is also suitable to the production of salts of organic acids. Also it is possible by employing the process above, to get salts with organic radicals, if it is possible to get with these reactions of "ions."

In the processes given above and their uses, the individual reactions or partial reactions may be known, but what is new and wherein lies this process, is the novel combinations of these partial reactions and the use of the differences in solubility whereby a continuous process operating in a cycle is obtained. This cycle of reactions is of great importance for the technical execution of the process. The discovery of the general rule forming a process in a closed cycle is the essential point of the invention.

The cyclic character of the process enables an advantageous arrangement of apparatus, very profitable for technical use.

It reduces all the losses in the manufacturing, avoids filtration and washings of precipitates—an evil very expensive and troublesome in the chemical industry and avoids any transport of the intermediary combinations.

It is a surprising fact, that the new process is even applicable to raw and impure materials. If raw salts of potassium containing sulphates (hard salt, carnallite, kainite) are employed, the combinations of calcium ($CaNO_3$) are to be used as intermediary materials, according to Example I. With raw potassium salts free from sulphate (sylvinite), they are replaced by salts of lead ($PbNO_3$) in accordance with Example V.

The circulating lye being saturated with sodium chloride, the NaCl contained in the raw salt remains substantially indissolved. On the cooling down of the lye, combinations of calcium and magnesium are chiefly precipitated. The final products received from the raw salts containing chiefly NaCl with an end product substantially of KCl, $MgNO_3$ and these are employed as a fertilizer and consist of potassium—magnesia—saltpetre. In the same manner, the proportion of compounds of magnesium rises in the final product, when $Mg(NO_3)_2$ is made from kieserite containing NaCl.

Producing nitrate of potassium from the corresponding raw salts, the reaction may also be effected by nitrate of magnesium, that preferably is to be used in concentrated solution to effect the reaction:

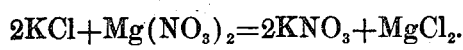

$$2KCl + Mg(NO_3)_2 = 2KNO_3 + MgCl_2.$$

The most essential part of the apparatus used for the new process is represented by the subjoined drawing. In the description it is supposed, that nitrate of potassium and sulphate of ammonium are to be obtained. It is evident, that it can be used also for other processes with similar reactions, especially in the production of nitrate of potassium and chloride of ammonium from their chlorides (Example V).

There are two reaction vessels 1 and 2 working alternately, furnished with an apparatus for stirring. At first the precipitation of the carbonate and then the solution of the carbonate takes place. In the drawing the carbonate of calcium in 1 is precipitated. Through the conduit 4 the necessary solution of sulphate of calcium is supplied. Through the main conduit 14 and pipe 6 ammonia is blown. The carbondioxide necessary for the reaction is supplied by pipe 7. By these means carbonate of calcium is precipitated. After the precipitation the solution in the vessel is removed through pipe 5 and employed for the solution of another quantity of sulphate of calcium formed by the reaction. Then the reaction begins again. This is continued till sufficient sulphate of ammonium is formed in the solution whereupon the latter can be obtained in the known manner by evaporation.

At the same time and in connection with the vessel 1, the vessel 2 of the same form is working. During the precipitation of carbonate in the first vessel, the solution of the carbonate and the formation of the carbondioxide, necessary for the first vessel, here takes place.

In the vessel 2 there is a precipitate of carbonate of calcium, resulting from the reaction which was ended in it (process b). Through pipe 8 the nitric acid is supplied, whilst the neutralized solution returns through pipe 9 to the towers serving for the absorption of nitrous gases, in order to supply new quantities of nitric acid. That is continued till sufficient nitrate of calcium is obtained and which is to be employed in the reactions (a).

The carbondioxide escaping from the solution of the carbonate is conducted through the pipes 10 and 15 to 7, serving for the precipitation in the first vessel.

The drawing shows the manner and the form of the vessels for reaction and their connection with the principal pipes, so arranged that the vessels can be employed either for precipitation or solution of carbonate of calcium by a simple manipulation of the valves.

The sulphate of calcium is conducted to and from the vessel through pipes 16 and 17, while through 18 and 19 the weak acid is conducted to and from said vessel. The pipes and connections out of use are represented by dotted lines in the drawing or signified by dotted arrows. They are working when the vessels are reversed, i. e., if the solution is made in 2, and the precipitation in 1. In this case through pipe 11 ammonia and pipe 12 carbondioxide is introduced during the time that carbondioxide originated by the action of the nitric acid is escaping.

The arrangement of the apparatus gives remarkable advantages. At first the carbonate of calcium remains as an intermediate material in the vessels, a very profitable thing considering, that the carbonate of calcium often is precipitated on the walls of the vessels and that in other processes it is necessary to take particular precautions to prevent it (as in the process of manufacturing sulphate of ammonium from gypsum).

In the arrangement above this evil is turned to an advantage, for the carbonate of calcium covering the walls of the vessels protects them from the attacks of the nitric acid necessary for the solutions.

The solution or the precipitation of sulphate of calcium may at the same time be effected with the precipitation or the solution of carbonate in the same vessel. In this manner also the transport of this material is avoided and separate vessels for the precipitation or the solution are not necessary.

The described apparatus gives also other advantages by avoiding the loss of carbondioxide necessary for the precipitation and—if the producing of especially pure products is done—each filtration and washing of precipitates is avoided, because it is impossible, that there is a loss by an unexact separation of the solutions from the precipitations.

Finally, the diagrammatic representation of the apparatus, while showing but two vessels, may be considered as two rows of such vessels operating alternatively. Such rows may then operate by the principle of counter-current, acknowledged in the industry, and be joined in two columns connected to each other.

I claim:

1. A cyclic process which comprises reacting on a soluble salt of a strong acid with a reagent comprising a soluble salt of a weaker acid having a different base, and forming a difficultly soluble salt of the stronger acid containing the base of the weaker acid salt and a soluble salt of the weaker acid with the base of the stronger acid salt, and converting the difficultly soluble salt of the stronger acid combined with the base of the weaker acid salt into the original reagent for reaction on a fresh quantity of strong acid salt.

2. A cyclic process, which comprises reacting on a soluble salt of a strong acid with a reagent comprising a soluble salt of a weaker acid having a different base and forming a difficultly soluble salt of the stronger acid and the base of the weaker acid salt, and a soluble salt of the weaker acid with the base of the stronger acid salt, separating the two salts, converting the former by a soluble base and an acid into an intermediate product and converting the intermediate product into the original reagent for action on fresh quantities of strong acid salt.

3. A cyclic process, which comprises reacting on the soluble salt of a strong acid with a reagent comprising a salt of a weaker acid having a different base, thereby forming a difficultly soluble salt and a desired product, treating the difficultly soluble salt with a base and a gaseous acid to form an easily soluble salt and an insoluble salt, and treating said insoluble salt with acid in free form to reform said reagent for return into the cycle of operations.

4. A process, which comprises reacting on the soluble salt of a strong acid with a reagent comprising a salt of a weaker acid having a different base, thereby forming a difficultly soluble salt of the stronger acid and a desired product, treating the difficulty soluble salt with a base and carbon dioxide thereby forming an easily soluble salt and an insoluble salt, and treating said insoluble salt with a free acid capable of reforming said reagent.

5. A process which comprises reacting on the soluble salt of a strong acid with a reagent comprising a salt of a weaker acid having a different base, thereby forming a difficultly soluble salt of the stronger acid and a desired product, treating the difficultly soluble salt with an alkaline base and carbon dioxide thereby forming an easily soluble salt and an insoluble salt, and treating said insoluble salt with a free acid capable of reforming said reagent.

6. A process, which comprises reacting on the soluble salt of a strong acid with a reagent comprising a salt of a weaker acid having a different base, thereby forming a difficultly soluble salt of the stronger acid and a desired product, treating the difficultly soluble salt with ammonia and carbon dioxide thereby forming an easily soluble salt and an insoluble salt, and treating said insoluble salt with a free acid capable of reforming said reagent.

7. A process which comprises reacting on a soluble sulphate with a soluble nitrate of a different base, thereby forming a difficultly soluble sulphate and a soluble nitrate, converting the latter sulphate into a more insoluble salt and converting the latter salt into nitrate for return into the cycle of operations.

8. The process which comprises reacting on a soluble alkali metal sulphate with calcium nitrate, thereby forming calcium sulphate and alkali metal nitrate, converting the calcium sulphate into a more insoluble salt and reacting on the latter to re-form calcium nitrate.

9. The process, which comprises reacting on potassium sulphate with calcium nitrate, thereby forming calcium sulphate and potassium nitrate, reacting on the latter sulphate with a base and a weak acid anhydrid to form a more insoluble calcium salt of said acid and converting the latter salt into calcium nitrate.

10. The process, which comprises reacting on potassium sulphate with calcium nitrate thereby forming calcium sulphate and potassium nitrate, reacting on the latter sulphate with a soluble base in the presence of carbon dioxide, thereby forming a soluble sulphate of said base and calcium carbonate, reacting on the carbonate with nitric acid to re-form calcium nitrate and carbon dioxide, and returning both into the cycle of operations.

11. The process, which comprises reacting on a soluble salt of a strong acid with a reagent comprising a soluble salt of a weaker acid having another base, thereby forming a soluble desired product and a difficultly soluble salt, reacting on the latter salt with a base and a weak acid gas, thereby forming an easily soluble salt and a salt of said acid gas, reacting on said acid gas salt with acid to re-form said reagent and liberate the weak acid gas and returning both reagent and liberated gas into the cycle of operations.

In testimony that I claim the foregoing as my invention, I have signed by name in presence of two subscribing witnesses.

HEINRICH HAMPEL, Dr. Phil.

Witnesses:
REINHARD VOGT,
HERMANN ALTHAUR.